Patented Aug. 6, 1946

2,405,470

UNITED STATES PATENT OFFICE 2,405,470

MANUFACTURE OF ACETIC ANHYDRIDE

Karl Heinrich Walter Tuerck, Banstead, and Hans Joachim Lichtenstein, Epsom Downs, England, assignors to The Distillers Company Limited, Edinburgh, Scotland, a British company No Drawing. Application October 29, 1942, Serial No. 463,820. In Great Britain July 28, 1941

5 Claims. (Cl. 260—546)

This invention is for improvements in or relating to the reduction of the peracid content of oxidation reaction products.

When oxidizing acetaldehyde in order to obtain acetic anhydride in good yields, the conditions of reaction are usually such as to cause the formation of considerable amounts of peracetic acid in the reaction mixture resulting in a spontaneous rise in temperature during the working-up operations. This rise in temperature is the cause of the explosions which, as is well-known, frequently occur in plants where acetaldehyde is oxidised to acetic acid.

It has been proposed to use manganese acetate or mixtures containing manganese acetate as catalysts for this oxidation reaction in order to avoid the formation of dangerous concentrations of peracetic acid, but where manganese acetate is really active in keeping the concentration of the peracetic acid low, it does not favour the formation of acetic anhydride.

According to the present invention there is provided a process for the manufacture of acetic anhydride which comprises oxidising acetaldehyde in the liquid phase with molecular oxygen at a temperature below 40° C. to produce a reaction mixture containing more than 3% by weight of percompounds, thereafter raising the temperature of the reaction mixture to a value of 40° to 50° C., contacting said reaction mixture with an atmosphere in which the partial pressure of oxygen is considerably less than the partial pressure of said molecular oxygen during the oxidation and maintaining the reaction mixture under those conditions for a period of time sufficient to reduce the content of percompounds therein to a value below 3% by weight, of the reaction mixture which is no longer dangerous.

The striking features of this process are the smooth reduction of the peracid, which may be present in an amount up to about 10% by weight in the product obtained in the oxidation under pressure, and the remarkable yield of acetic anhydride obtained, despite the fact that quick cooling of the reaction mixture after the oxidation has been considered an essential condition for the manufacture of acetic anhydride by processes hitherto proposed such for example as those described in prior U. S. Patent 2,177,494 and British Patents Nos. 446,259 and 443,151.

Heating for a period of from 5–30 minutes has been found to be sufficient.

The following examples illustrate the process of the present invention as applied to the production of acetic anhydride from paraldehyde.

*Example I.*—100 g. of paraldehyde containing 0.1 g. vanadic acid and (as a depolymerising agent for the paraldehyde) 0.14 g. paratoluene-sulphonic acid are oxidized at 33° C. by introducing oxygen under 10 lbs. pressure, the reaction mixture being vigorously stirred.

After 40 minutes the amount of acetic anhydride present is 40% by weight and the amount of peracetic acid is 9% by weight. The oxygen pressure is then released and air is admitted to the reaction vessel. The stirring is continued for a further 10 minutes, the temperature being raised to and maintained at 40° C. The mixture then contains acetic anhydride, in a yield of 36.5% by weight and 2.07% by weight of peracetic acid.

*Example II.*—The reaction was carried out as in Example I except that instead of heating at 40° C. with air, nitrogen was introduced and the temperature was raised to 45° C. After 2 minutes it was found that the content of percompounds had fallen to less than 0.8% by weight.

In a reaction carried out by way of comparison the oxidation was carried out at 40° C., the yield in acetic anhydride being only 29.6% by weight, and the concentration of the peracid being 5.4% by weight.

When oxygen was used instead of air during the decomposition of the peracid, the final concentration of the peracid was 2.8%.

The decomposition of the peracid in this process proceeds quickly in the region of its higher concentrations, and slows down to reach a final value, which depends on the oxygen concentration; we break off the treatment as soon as this final value is reached or approached.

The reaction products are, after reduction of the peracid content thereof as above described, either worked up in the usual ways or their peracid content can be further reduced by means of the addition of manganese salts or suitable chemical reducing agents. When applied to the production of acetic anhydride the amount of manganese salt added should preferably not be greater than is sufficient to neutralise the catalysts.

It is also possible to operate the process of this invention so as to reduce the amount of percompounds in the reaction mixture simultaneously with the oxidation process. For this purpose, a portion of the reaction mixture is withdrawn, either continuously or periodically, from the oxidation vessel and heated in an atmosphere poor in oxygen to a temperature up to about 45° C. for a short period, to reduce the contents of percompounds therein, and then return to the oxidation vessel. By this means the content of percompounds in the oxidation vessel can be maintained at a low value without the yield of acetic anhydride being seriously affected.

It will be appreciated that the present invention is applicable to any process in which percompounds are formed as a result of an oxidation of acetaldehyde and is not limited to the production of acetic anhydride from paraldehyde. The invention is, of course, applicable to the oxidation of acetaldehyde to acetic anhydride.

What we claim is:

1. In a process for the manufacture of acetic anhydride by the oxidation of acetaldehyde in the liquid phase by means of molecular oxygen, the steps consisting in effecting the oxidation at a temperature below 40° C. to produce a reaction mixture containing acetic anhydride, acetic acid, water and more than 3% by weight of percompounds, thereafter, and prior to the working up of the reaction mixture, treating the reaction mixture to reduce its content of percompounds by raising the temperature of the reaction mixture to a value of 40° to 50° C., contacting said reaction mixture with an atmosphere poor in oxygen and maintaining the reaction mixture under those conditions for a period of time sufficient to reduce the content of percompounds therein to a value below 3% by weight.

2. In a process for the manufacture of acetic anhydride by the oxidation of acetaldehyde in the liquid phase by means of molecular oxygen under superatmospheric pressure, the steps consisting in effecting the oxidation at a temperature below 40° C. to produce a reaction mixture containing acetic anhydride, acetic acid, water and more than 3% by weight of percompounds, thereafter, and prior to the working up of the reaction mixture, treating the reaction mixture to reduce its content of percompounds by raising the temperature of the reaction mixture to a value of 40° to 50° C., contacting said reaction mixture with an atmosphere poor in oxygen and maintaining the reaction mixture under those conditions for a period of time sufficient to reduce the content of percompounds therein to a value below 3% by weight.

3. In a process for the manufacture of acetic anhydride by the oxidation of acetaldehyde in the liquid phase by means of molecular oxygen, the steps consisting in effecting the oxidation with oxygen at a temperature below 40° C. to produce a reaction mixture containing acetic anhydride, acetic acid, water and more than 3% by weight of percompounds, thereafter, and prior to the working up of the reaction mixture, treating the reaction mixture to reduce its content of percompounds by raising the temperature of the reaction mixture to a value of 40° to 50° C., contacting said reaction mixture with an atmosphere of air and maintaining the reaction mixture under those conditions for a period of time sufficient to reduce the content of percompounds therein to a value below 3% by weight.

4. In a process for the manufacture of acetic anhydride by the oxidation of acetaldehyde in the liquid phase by means of molecular oxygen, the steps consisting in effecting the oxidation at a temperature below 40° C. to produce a reaction mixture containing acetic anhydride and more than 3% by weight of percompounds, thereafter, and prior to the recovery of the acetic anhydride from the reaction mixture, treating the reaction mixture to reduce its content of percompounds by raising the temperature of the reaction mixture to a value of 40° to 50° C., contacting said reaction mixture with an atmosphere of nitrogen and maintaining the reaction mixture under those conditions for a period of time sufficient to reduce the content of percompounds therein to a value below 3% by weight.

5. In a continuous process for the manufacture of acetic anhydride by the oxidation of acetaldehyde in the liquid phase by means of molecular oxygen, the steps consisting in effecting the oxidation in a reactor at a temperature below 40° C. to produce a reaction mixture containing acetic anhydride, acetic acid, water and more than 3% by weight of percompounds, continually withdrawing a portion of the reaction mixture from said reactor, raising the temperature of said portion of the reaction mixture to a value of 40° to 50° C. whilst contacting it with an atmosphere poor in oxygen for a sufficient period of time to reduce its content of percompounds to a value below 3% by weight, returning said treated portion of the reaction mixture to the reactor, continually withdrawing a second portion of the reaction mixture from said reactor and treating said second portion for the recovery of acetic anhydride therefrom.

KARL HEINRICH WALTER TUERCK.
HANS JOACHIM LICHTENSTEIN.